United States Patent
Land et al.

(10) Patent No.: US 11,996,623 B2
(45) Date of Patent: May 28, 2024

(54) UWB ANTENNA SOLUTIONS FOR INCREASED ACCURACY FOR INTENT DETECTION IN ACCESS CONTROL SYSTEMS

(71) Applicant: Schlage Lock Company LLC, Carmel, IN (US)

(72) Inventors: Joseph Land, Danville, IN (US); Ryan C. Kincaid, Indianapolis, IN (US); David Brown, Greenwood, IN (US); Molly Dixon, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 160 days.

(21) Appl. No.: 17/566,974

(22) Filed: Dec. 31, 2021

(65) Prior Publication Data

US 2023/0216216 A1   Jul. 6, 2023

(51) Int. Cl.
| | |
|---|---|
| H01Q 21/28 | (2006.01) |
| G07C 9/00 | (2020.01) |
| H01Q 1/36 | (2006.01) |
| H01Q 3/24 | (2006.01) |

(52) U.S. Cl.
CPC ......... *H01Q 21/28* (2013.01); *G07C 9/00944* (2013.01); *H01Q 1/36* (2013.01); *H01Q 3/24* (2013.01); *G07C 2009/0096* (2013.01)

(58) Field of Classification Search
CPC . H01Q 21/28; H01Q 1/36; H01Q 3/24; G07C 9/00944; G07C 2009/0096
USPC .......................................................... 343/702
See application file for complete search history.

(56) References Cited

U.S. PATENT DOCUMENTS

| | | |
|---|---|---|
| 6,720,861 B1 | 4/2004 | Rodenbeck et al. |
| 8,319,605 B2 | 11/2012 | Hassan et al. |
| 9,196,104 B2 | 11/2015 | Dumas et al. |
| 9,218,696 B2 | 12/2015 | Dumas et al. |
| 9,336,637 B2 | 5/2016 | Neil et al. |

(Continued)

FOREIGN PATENT DOCUMENTS

| | | |
|---|---|---|
| CN | 102906360 A | 1/2013 |
| CN | 107945316 A | 4/2018 |

(Continued)

OTHER PUBLICATIONS

International Search Report; International Searching Authority; International Application No. PCT/US2023/010025; dated May 2, 2023; 2 pages.

(Continued)

*Primary Examiner* — Hai V Tran
(74) *Attorney, Agent, or Firm* — Taft Stettinius & Hollister LLP

(57) ABSTRACT

An electronic lock according to an embodiment includes an exterior escutcheon on an unsecure side of the door, an interior escutcheon on a secure side of the door, a printed circuit board assembly (PCBA) positioned within the exterior escutcheon, and a plurality of ultra wideband (UWB) antennas secured to an exterior-facing side of the PCBA, wherein the plurality of UWB antennas comprises a first UWB antenna and a second UWB antenna configured to operate on a first UWB channel, and wherein the second UWB antenna is positioned no greater than one half of a wavelength of the first UWB channel from the first UWB antenna along a first axis.

20 Claims, 8 Drawing Sheets

(56) References Cited

U.S. PATENT DOCUMENTS

| | | | |
|---|---|---|---|
| 9,378,598 B2 | 6/2016 | Dumas et al. | |
| 9,512,643 B1 | 12/2016 | Keefe | |
| 9,970,229 B1 | 5/2018 | Favila et al. | |
| 10,453,281 B1 | 10/2019 | Lopez et al. | |
| 10,619,380 B2 | 4/2020 | Ahearn et al. | |
| 10,719,999 B2 | 7/2020 | Love et al. | |
| 10,759,389 B2 | 9/2020 | Ledvina et al. | |
| 10,760,332 B2 | 9/2020 | Kincaid et al. | |
| 11,562,609 B2 | 1/2023 | Prostko et al. | |
| 11,663,864 B2 | 5/2023 | Kincaid et al. | |
| 2002/0067259 A1 | 6/2002 | Fufidio et al. | |
| 2005/0046546 A1 | 3/2005 | Masudava | |
| 2006/0044196 A1* | 3/2006 | Grant | H01Q 9/42 343/711 |
| 2006/0164208 A1 | 7/2006 | Schaffzin et al. | |
| 2009/0002246 A1 | 1/2009 | Rabinovich et al. | |
| 2010/0201482 A1 | 8/2010 | Robertson et al. | |
| 2012/0032850 A1 | 2/2012 | Nakagawa et al. | |
| 2012/0234058 A1 | 9/2012 | Neil et al. | |
| 2013/0017789 A1* | 1/2013 | Chi | G02B 27/01 455/41.2 |
| 2013/0176107 A1 | 7/2013 | Dumas et al. | |
| 2013/0237193 A1 | 9/2013 | Dumas et al. | |
| 2013/0241694 A1 | 9/2013 | Sharma et al. | |
| 2014/0148196 A1 | 5/2014 | Bassan-Eskenazi et al. | |
| 2014/0292481 A1 | 10/2014 | Dumas et al. | |
| 2014/0361947 A1 | 12/2014 | Haridas et al. | |
| 2015/0002367 A1* | 1/2015 | Kosaka | H01Q 1/48 343/893 |
| 2015/0121465 A1 | 4/2015 | Berns et al. | |
| 2015/0213663 A1 | 7/2015 | Dumas et al. | |
| 2015/0309487 A1 | 10/2015 | Lyman | |
| 2016/0055692 A1 | 2/2016 | Trani | |
| 2016/0086400 A1 | 3/2016 | Dumas et al. | |
| 2016/0180620 A1 | 6/2016 | Eyring et al. | |
| 2016/0189453 A1 | 6/2016 | Johnson et al. | |
| 2016/0217638 A1 | 7/2016 | Child et al. | |
| 2016/0227362 A1 | 8/2016 | Howard et al. | |
| 2016/0307385 A1 | 10/2016 | Arfwedson et al. | |
| 2016/0332598 A1 | 11/2016 | Ghabra et al. | |
| 2016/0337863 A1 | 11/2016 | Robinson et al. | |
| 2016/0350992 A1 | 12/2016 | Telljohann et al. | |
| 2017/0303090 A1 | 10/2017 | Stitt et al. | |
| 2017/0323093 A1 | 11/2017 | Liu et al. | |
| 2017/0372542 A1 | 12/2017 | Romero et al. | |
| 2018/0052217 A1 | 2/2018 | Jonsson | |
| 2018/0056939 A1 | 3/2018 | van Roermund et al. | |
| 2018/0102008 A1 | 4/2018 | Dupart et al. | |
| 2018/0162321 A1 | 6/2018 | Spiess | |
| 2018/0242105 A1 | 8/2018 | Sute | |
| 2018/0315262 A1 | 11/2018 | Love et al. | |
| 2020/0149317 A1 | 5/2020 | Seacat et al. | |
| 2020/0168017 A1 | 5/2020 | Prostko et al. | |
| 2020/0314651 A1 | 10/2020 | Pirch et al. | |
| 2021/0158637 A1 | 5/2021 | Kincaid et al. | |
| 2023/0010267 A1 | 1/2023 | Kincaid et al. | |
| 2023/0213637 A1 | 7/2023 | Brown et al. | |

FOREIGN PATENT DOCUMENTS

| | | |
|---|---|---|
| EP | 2930071 A1 | 10/2015 |
| WO | 2014155255 A1 | 10/2014 |
| WO | 2016177666 A1 | 11/2016 |
| WO | 2017180563 A1 | 10/2017 |
| WO | 2017180688 A1 | 10/2017 |
| WO | 2018071671 A2 | 4/2018 |
| WO | 2020083750 A1 | 4/2020 |
| WO | 2020193566 A1 | 10/2020 |
| WO | 2021058479 A1 | 4/2021 |
| WO | 2021249828 A1 | 12/2021 |

OTHER PUBLICATIONS

Written Opinion of the International Searching Authority; International Searching Authority; International Application No. PCT/US2023/010025; dated May 2, 2023; 7 pages.

Shikiar, A. et al., The Future of Authentication for the Internet of Things, FIDO Alliance, Mar. 28, 2017, https://fidoalliance.org/wpcontenVuploads/The_Future_of_Authentication_for_IoT_Webinar_170328_v10.pdf, 56 pages.

Developing Beacons with Bluetooth Low Energy (BLE) Technology; Silicon Laboratories; http://www.silabs.com/products/wireless/bluetooth/developing-beacons-with-bluetooth-low-energy-ble-technology; (last visited Apr. 27, 2017).

Angle of arrival; Wikipedia; https://en.wikipedia.org/wiki/Angle_of_arrival; (last visited Apr. 27, 2017).

What do you want to track? Whatever you want to track, Quuppa brings you the dot on the map.; Quuppa—Do More With Location; http://quuppa.com/; (last visited Apr. 27, 2017).

Indoor Location Positioning Technology: Research, Solutions & Trends; Grizzly Analytics; http://www.grizzlyanalytics.com/report_2015_02_indoor.html; (last visited Apr. 27, 2017).

Front Page—Car Connectivity Consortium; Car Connectivity Consortium; retrieved on Jan. 13, 2021; https://carconnectivity.org/; 6 pages.

Volkswagen and NXP Show First Car Using UWB to Combat Relay Theft; EE Times; retrieved on Jan. 13, 2021; https://www.eetimes.com/volkswagen-and-nxp-show-first-car-using-uwb-to-combat-relay-theft/; 4 pages.

Car thefts up 49% in five years following advent of keyless-entry technology; The Sunday Times Driving; retrieved on Jan. 13, 2021; https://www.driving.co.uk/news/many-cars-sale-today-risk-keyless-theft-new-research-finds/; 6 pages.

Front Page—UWB Alliance; UWB Alliance; retrieved on Jan. 13, 2021; https://uwballiance.org/; 11 pages.

Alliance Rallies UWB for Location Services; EE Times; retrieved on Jan. 13, 2021; https://www.eetimes.com/alliance-rallies-uwb-for-location-services/; 2 pages.

UWB Alliance to focus on interoperability, further boosting the UWB ecosystem; FierceWireless; retrieved on Jan. 13, 2021; https://www.fiercewireless.com/wireless/uwb-alliance-to-focus-interoperability-further-boosting-uwb-ecosystem; 4 pages.

Front Page—FiRa Consortium; FiRa Consortium; retrieved on Jan. 13, 2021; https://www.firaconsortium.org/; 3 pages.

Introduction to the FiRa Consortium; FiRa Consortium; Aug. 1, 2019; 17 pages.

Ultra-Wideband (UWB) Gains Traction as a Sensing Technology Under New Industry Consortium; Forbes; retrieved on Jan. 13, 2021; https://www.forbes.com/...01/ultra-wideband-uwb-gains-traction-as-a-sensing-technology-under-new-industry-consortium/?sh=62102d366e21; 6 pages.

The Biggest iPhone News Is a Tiny New Chip Inside It; Wired; retrieved on Jan. 13, 2021; https://www.wired.com/story/apple-u1-chip/; 5 pages.

Apple built UWB into the iPhone 11. Here's what you need to know (FAQ); cnet; retrieved on Jan. 13, 2021; https://www.cnet.com/news/apple-built-uwb-into-the-iphone-11-heres-what-you-need-to-know-faq/; 6 pages.

Ultra-Wideband (UWB); NXP; retrieved on Jan. 13, 2021; https://www.nxp.com/applications/enabling-technologies/connectivity/ultra-wideband-uwb:UWB; 7 pages.

NXP Introduces Higher Security Using Ultra-Wideband Technology; Forbes; https://www.forbes.com/sites/tiriasresearch/2019/06/26/nxp-introduces-higher-security-using-ultra-wideband-technology/?sh=dc7565238410retrieved on Jan. 13, 2021; 5 pages.

Front Page—Decawave; Decawave; retrieved on Jan. 13, 2021; https://www.decawave.com/; 5 pages.

* cited by examiner

UWB ANTENNA SOLUTIONS FOR INCREASED ACCURACY FOR INTENT DETECTION IN ACCESS CONTROL SYSTEMS

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems often require an active physical action on behalf of the user in order to grant the user access via the access control device.

SUMMARY

One embodiment is directed to a unique system, components, and methods for UWB antenna solutions for access control. Other embodiments are directed to apparatuses, systems, devices, hardware, methods, and combinations thereof UWB antenna solutions for access control.

According to an embodiment, an electronic lock configured to be secured to a door having a secure side and an unsecure side may include an exterior escutcheon on the unsecure side of the door, an interior escutcheon on the secure side of the door, a printed circuit board assembly (PCBA) positioned within the exterior escutcheon, and a plurality of ultra wideband (UWB) antennas secured to an exterior-facing side of the PCBA, wherein the plurality of UWB antennas comprises a first UWB antenna and a second UWB antenna configured to operate on a first UWB channel, and wherein the second UWB antenna is positioned no greater than one half of a wavelength of the first UWB channel from the first UWB antenna along a first axis.

In some embodiments, the first axis may be a horizontal axis.

In some embodiments, the plurality of UWB antennas may be a third UWB antenna configured to operate on the first UWB channel and positioned no greater than one half of the wavelength of the first UWB channel from the second UWB antenna along the first axis.

In some embodiments, the plurality of UWB antennas may be a third UWB antenna configured to operate on the first UWB channel and positioned no greater than one half of the wavelength of the first UWB channel from the second UWB channel along a second axis perpendicular to the first axis.

In some embodiments, the electronic lock may further include a third UWB antenna secured to an interior side of the PCBA.

In some embodiments, the electronic lock may further include a waveguide positioned between the third UWB antenna and a surface of the interior escutcheon, and the waveguide may be structured to allow for unobstructed radio frequency (RF) transmission.

In some embodiments, the electronic lock may further include a housing defined at least in part by the interior escutcheon and the exterior escutcheon, and a cavity within the housing may define the waveguide.

In some embodiments, the plurality of UWB antennas may include a third UWB antenna configured to operate on a second UWB channel and positioned no greater than one half of a wavelength of the second UWB channel from the second UWB antenna.

In some embodiments, the second UWB antenna may be positioned one half of the wavelength of the first UWB channel from the first UWB antenna and the third UWB antenna may be positioned one half of the wavelength of the second UWB channel from the second UWB antenna.

In some embodiments, the one half of the wavelength of the first UWB channel may be determined based on a center frequency of the first UWB channel.

In some embodiments, the electronic lock may further include a processor and a memory comprising a plurality of instructions stored thereon that, in response to execution by the processor, causes the electronic lock to determine whether a user intends to access a passageway secured by the door based on signals received by the plurality of UWB antennas.

According to another embodiment, an access control device may include a lock mechanism adapted to control access to a passageway, a printed circuit board assembly having a first side and a second side, a first ultra wideband antenna secured to the first side of the printed circuit board assembly and configured to operate on a first ultra wideband channel, a second ultra wideband antenna secured to the first side of the printed circuit board assembly no greater than one half of a wavelength of the first ultra wideband channel from the first ultra wideband antenna along a first axis and configured to operate on a first ultra wideband channel, an exterior escutcheon adapted to be secured to an unsecure side of a door and to house the printed circuit board assembly, a processor, and a memory comprising a plurality of instructions stored thereon that, in response to execution by the processor, causes the access control device to determine whether a user intends to access the passageway based on signals received by the first ultra wideband antenna and the second ultra wideband antenna from a mobile device of the user.

In some embodiments, the access control device may further include a third ultra wideband antenna secured to the first side of the printed circuit board assembly no greater than one half of the wavelength of the first ultra wideband channel from the second ultra wideband antenna along the first axis and configured to operate on the first ultra wideband channel.

In some embodiments, the access control device may further include a third ultra wideband antenna secured to the first side of the printed circuit board assembly no greater than one half of the wavelength of the first ultra wideband channel from the second ultra wideband antenna along a second axis perpendicular to the first axis and configured to operate on the first ultra wideband channel.

In some embodiments, the access control device may further include a third ultra wideband antenna secured to the second side of the printed circuit board assembly.

In some embodiments, the access control device may further include an interior escutcheon adapted to be secured to a secure side of the door and a waveguide structured to allow for unobstructed radio frequency (RF) transmission that is positioned between the third ultra wideband antenna and a surface of the interior escutcheon.

In some embodiments, the access control device may further include a housing defined at least in part by the interior escutcheon and the exterior escutcheon, and a cavity within the housing may define the waveguide.

In some embodiments, the access control device may further include a third ultra wideband antenna configured to operate on a second ultra wideband channel and secured to the first side of the printed circuit board assembly no greater that one half of a wavelength of the second ultra wideband channel from the second ultra wideband antenna.

In some embodiments, the one half of the wavelength of the first ultra wideband channel may be determined based on a center frequency of the first ultra wideband channel.

According to yet another embodiment an access control system may include a mobile device and an access control device including a printed circuit board assembly having a first side and a second side, a first ultra wideband antenna secured to the first side of the printed circuit board assembly and configured to operate on a first ultra wideband channel, a second ultra wideband antenna secured to the first side of the printed circuit board and configured to operate on the first ultra wideband channel, an exterior escutcheon adapted to be secured to a structure at an unsecure side of a passageway and to house the printed circuit board assembly, a processor, and a memory comprising a plurality of instructions stored thereon that, in response to execution by the processor, causes the access control device to determine whether a user intends to access the passageway based on signals received by the first ultra wideband antenna and the second ultra wideband antenna from the mobile device.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
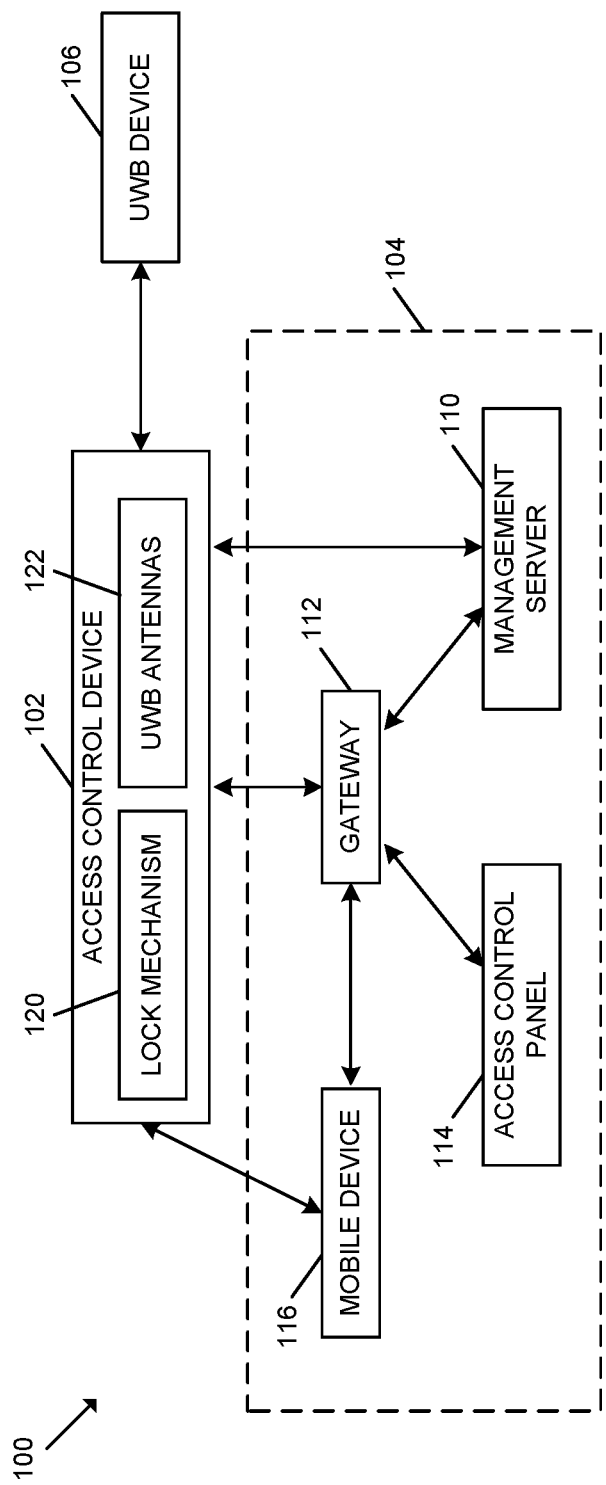
FIG. 1 is a simplified block diagram of at least one embodiment of an access control system for leveraging ultra wideband (UWB) antenna solutions for increased accuracy for intent detection.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Referring now to FIG. 1, in the illustrative embodiment, an access control system 100 for leveraging ultra wideband (UWB) antenna solutions for increased accuracy for detecting user intent to gain access to a passageway is shown. The illustrative access control system 100 includes an access control device 102, a management system 104, and a UWB device 106. Further, the management system 104 may include a management server 110, a gateway device 112, an access control panel 114, and/or a mobile device 116.

As described in detail below, the access control device 102 may control access to a passageway (e.g., through a doorway) via a lock mechanism 120 based on an intent of the user of a UWB device 106 (e.g., a UWB-capable smartphone) inferred based on UWB communication signals received from the UWB device 106. In particular, the access control device 102 may determine the location of the UWB device 106 relative to the access control device 102 based on phase difference of arrival (PDoA) and angle of arrival (AoA) calculations from UWB signals received by the UWB antennas 122 of the access control device 102. It should be appreciated that the access control device 102 may determine the relative location of the UWB device 106 as a two-dimensional location or a three-dimensional location depending on the particular embodiment. Further, the access control device 102 may determine whether the relative location of the UWB device 106 corresponds with a location indicative of the user's intent to access the passageway (e.g., based on one or more threshold distances, threshold angles, and/or previously stored intent locations). If the relative location indicates that the user intends to access the passageway, in some embodiments, the access control device 102 may automatically control the lock mechanism 120 without requiring user input or a physical action by the user (e.g., to unlock the lock mechanism 120).

It should be appreciated that the access control device 102, the management system 104, the UWB device 106, the management server 110, the gateway device 112, the access control panel 114, and/or the mobile device 116 may be embodied as any type of device or collection of devices suitable for performing the functions described herein.

More specifically, in the illustrative embodiment, the access control device 102 may be embodied as any type of device capable of controlling access through a passageway. For example, in various embodiments, the access control device 102 may be embodied as an electronic lock (e.g., a mortise lock, a cylindrical lock, or a tubular lock) or a peripheral controller of a passageway. In some embodiments, it should be appreciated that the access control device 102 may be embodied as an electronic lock similar to the electronic lock 302 of FIG. 3. Depending on the particular embodiment, the access control device 102 may include a credential reader or be electrically/communicatively coupled to a credential reader configured to communicative with UWB device 106. As described herein, the access control device 102 includes a plurality of UWB antennas 122 for determining the relative location of UWB devices 106 in the vicinity of the access control device 102 (e.g., user mobile devices that may be interested in gaining access through the passageway secured by the access control device 102). Further, it should be appreciated that the access control device 102 may also include other wireless communication circuitry for communicating with the UWB device 106 and/or other devices via corresponding protocols (e.g., Wi-Fi, Bluetooth (e.g., including BLE), Zigbee, Z-Wave, Near Field Communication (NFC), Thread, etc.). Additionally, in various embodiments, the access control device 102 may include a capacitive sense circuitry (e.g., a capacitive touch sensor), proximity sensor, and/or other access control circuitry.

The illustrative access control device 102 includes a lock mechanism 120 configured to control access through a passageway. For example, in some embodiments, the lock mechanism 120 may be configured to be positioned in a locked state in which access to the passageway is denied, or positioned in an unlocked state in which access to the passageway is permitted. In some embodiments, the lock mechanism 120 includes a deadbolt, latch bolt, lever, and/or other mechanism adapted to move between the locked and unlocked state and otherwise perform the functions described herein. However, it should be appreciated that the lock mechanism 120 may be embodied as any another mechanism suitable for controlling access through a passageway in other embodiments.

As described herein, the access control device 102 includes a plurality of UWB antennas 122 positioned apart from one another such that a UWB signal may be received by the UWB antennas 122 to allow the access control device 102 to determine a relative location of the sending device (e.g., the UWB device 106) based on angle of arrival (AoA) and phase difference of arrival (PDoA) calculations made as part of a ranging session between the devices. It should be appreciated that the number, spacing, and arrangement of the UWB antennas 122 within the access control device 102 directly impact the accuracy of the location tracking. Various embodiments of UWB antenna arrays or arrangements are described below in reference to FIGS. 4-10.

In the illustrative embodiment, the UWB device 106 may be embodied as any mobile device capable of communicating with the access control device 102 via UWB signals (e.g., for UWB ranging), exchanging credential information with the access control device 102, and/or otherwise performing the functions described herein. Accordingly, in some embodiments, in addition to having UWB communication circuitry, it should be appreciated that the UWB device 106 may also include other wireless communication circuitry for communicating with the access control device 102 and/or other devices via corresponding protocols (e.g., Wi-Fi, Bluetooth (e.g., including BLE), Zigbee, Z-Wave, Near Field Communication (NFC), Thread, etc.).

As described herein, the management system 104 may be configured to manage credentials of the access control system 100. For example, the management system 104 may be responsible for ensuring that the access control devices 102 have updated authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 such that the other devices of the management system 104 (e.g., the management server 110, the access control panel 114, and/or the mobile device 116) may communicate with the access control device 102 via the gateway device 112.

In some embodiments, the access control device 102 may communicate with the management server 110 over a Wi-Fi connection and/or with the mobile device 116 over a Bluetooth connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an online mode with a persistent real-time communication connection or via an offline mode (e.g., periodically or in response to an appropriate condition) depending on the particular embodiment (e.g., depending on whether the access control device 102 is offline). As indicated above, in other embodiments, it should be appreciated that the access control device 102 may communicate with the devices of the management system 104 via one or more other suitable communication protocols.

It should be appreciated that each of the access control device 102, the management system 104, the UWB device 106, the management server 110, the gateway device 112, the access control panel 114, and/or the mobile device 116 may be embodied as one or more computing devices similar to the computing device 200 described below in reference to FIG. 2. For example, in the illustrative embodiment, each of the access control device 102, the management system 104, the UWB device 106, the management server 110, the gateway device 112, the access control panel 114, and the mobile device 116 includes a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one access control device 102, one management system 104, one UWB device 106, one management server 110, one gateway device 112, one access control panel 114, and one mobile device 116 are shown in the illustrative embodiment of FIG. 1, the system 100 may include multiple access control devices 102, management systems 104, UWB devices 106, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate UWB devices 106 in some embodiments.

Figure 2:
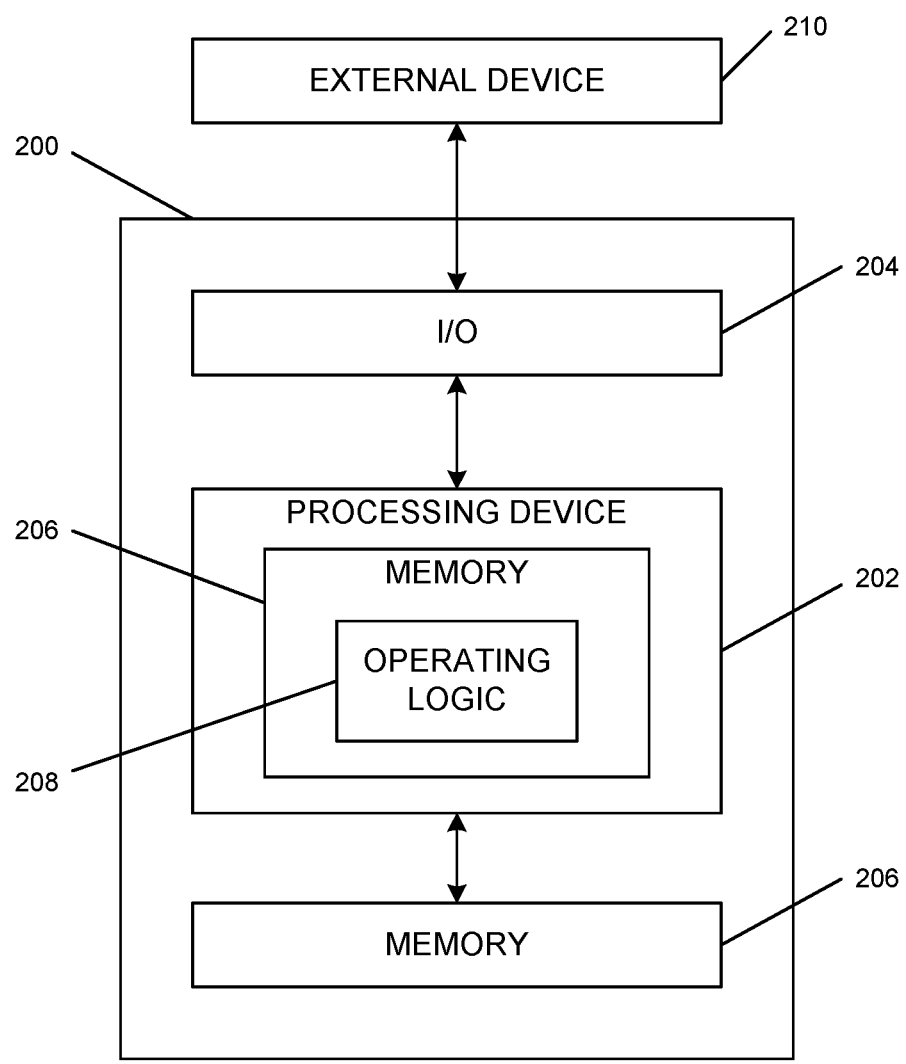
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of an access control device, UWB device, mobile device, management server, gateway device, and/or access control panel that may be utilized in connection with the access control device 102, the management system 104, the UWB device 106, the management server 110, the gateway device 112, the access control panel 114, and/or the mobile device 116 illustrated in FIG. 1. Depending on the particular embodiment, computing device 200 may be embodied as a reader device, credential device, access control device, UWB-capable device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the UWB device 106, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
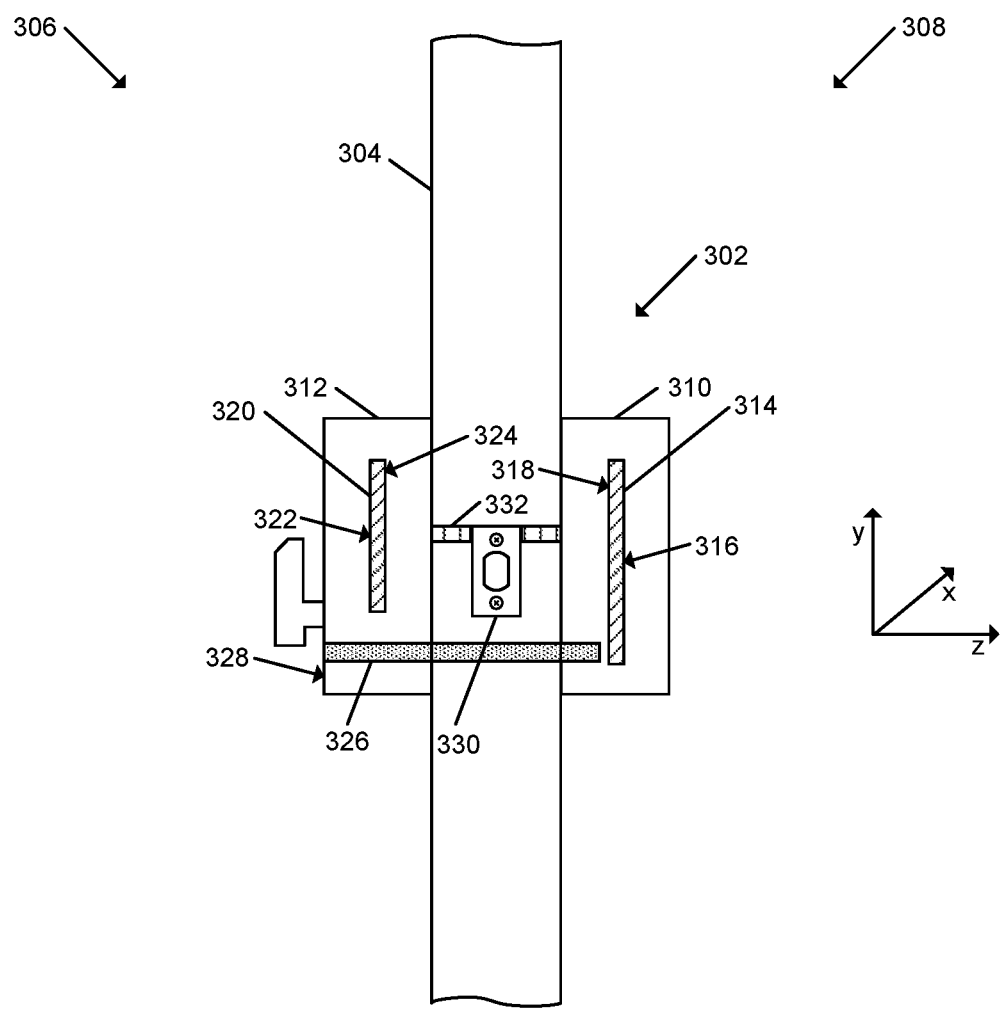
FIG. 3 is a side view of at least one embodiment of an electronic lock for levering the UWB antenna solutions.

Referring now to FIG. 3, in some embodiments, the access control device 102 may be embodied as an electronic lock similar to the electronic lock 302 of FIG. 3, which is secured to a door 304 and configured to control passage through the door 304. It should be appreciated that the door 304 has a secure side 306 (e.g., an exterior side of a perimeter door) and an unsecure side 308 (e.g., an interior side of a perimeter door). Further, as shown, the illustrative electronic lock 302 has a housing defined at least in part by an exterior escutcheon 310 configured to be secured at or to an unsecure side 308 of the door 304 and an interior escutcheon 312 configured to be secured at or to a secure side 306 of the door 304. In the illustrative embodiment, the electronic lock 302 includes a printed circuit board assembly (PCBA) 314 that is positioned within (e.g., mounted within) the exterior escutcheon 310, and the PCBA 314 has an exterior-facing side (or "exterior side") 316 and an interior-facing side (or simply "interior side") 318. In some embodiments, the electronic lock 302 also includes a PCBA 320 that is positioned within (e.g., mounted within) the interior escutcheon 312, and the PCBA 320 has an interior-facing side 322 and an exterior-facing side 324.

As described herein, the electronic lock 302 includes a plurality of UWB antennas 122, which may be secured to an exterior-facing side 316 of the PCBA 314, an interior-facing side 318 of the PCBA 314, an interior-facing side 322 of the PCBA 320, and/or an exterior-facing side 324 of the PCBA 320 depending on the particular embodiment. For example, in various embodiments described in greater detail below (see, for example, FIGS. 4-10), the electronic lock 302 includes a plurality of UWB antennas 122 secured to an exterior-facing side 316 of the PCBA 314 and zero or more UWB antennas 122 secured to an inter-facing side 318 of the PCBA 314. Further, it should be appreciated that other electronic components of the electronic lock 302 (e.g., processor, memory, sensors, etc.) may be secured to one or more of the PCBAs 314, 320 depending on the particular embodiment.

In some embodiments, the electronic lock 302 includes a waveguide 326 that is structured to allow for unobstructed radio frequency (RF) transmission to and/or from one or more UWB antennas 122. For example, in some embodiments, the waveguide 326 allows for unobstructed RF transmission to and/or from a UWB antenna 122 secured to the interior-facing side 318 of the PCBA 314. More specifically, in some embodiments, the waveguide 326 may be positioned and/or defined between a UWB antenna 122 secured to the inter-facing side 318 of the PCBA 314 and a surface 328 of the interior escutcheon 312. It should be appreciated that the waveguide 326 may be formed of one or more physical components that allow for the transmission of RF signals and/or formed from the absence of physical components depending on the particular embodiment. For example, in some embodiments, the exterior escutcheon 310 and the interior escutcheon 312 may form at least a portion of a housing of the electronic lock 302 that has a cavity therein defining the waveguide 326.

Although the escutcheons and sides are described herein with reference to "interior" and "exterior," it should be appreciated that such terminology is used simply for convenience and brevity of the description. For example, in some embodiments, both sides of the door 304 may be interior in the sense that both sides of the door 304 are within the perimeter of a building (e.g., as for a wholly interior door). Additionally, although the illustrative embodiment depicts the electronic lock 302 as being secured to the door 304, it should be appreciated that the electronic lock 302 (or other embodiment of the access control device 102) may be secured to a different structure in other embodiments (e.g., the door frame, a wall, etc.). For example, in some embodiments, the access control device 102 may be embodied as a wall-mounted reader or peripheral controller.

The illustrative electronic lock 302 includes a lock mechanism 330, which may be similar to the lock mechanism 120 described above in reference to FIG. 1. In particular, the illustrative lock mechanism 330 may include a deadbolt, latch bolt, lever, and/or other mechanism that may be positioned in a locked state to secure the door 304 and prevent passage through the door 304 (i.e., when the door 304 is closed) or may be positioned in an unlocked state to allow passage through the door 304. Further, in some embodiments, the electronic lock 302 may include a wire harness 332 that extends through at least a portion of the door 304 and electrically couples various electronic components of the electronic lock 302 to one another. For example, the wire harness 332 may form a portion of circuitry that includes the PCBAs 314, 320 (and components thereon), the lock mechanism 330, and/or other components of the electronic lock 302 depending on the particular embodiment.

FIGS. 4-10 illustrate various UWB antenna 122 arrangements of the access control device 102 and/or the electronic lock 302. Although the description of FIGS. 4-10 applies equally to the electronic lock 302 in various embodiments, it should be appreciated that FIGS. 4-10 are described in reference to the access control device 102 for brevity of the description. In FIGS. 4-5 and 8-9, the solid fill is used to indicate that the corresponding components are secured to a top layer of the corresponding PCBA, and the hashed fill is used to indicate that the corresponding components are on the bottom/opposite layer of the corresponding PCBA. Further, in some embodiments, the UWB antennas 122 are secured to the PCBA 314. For example, in such embodiments, the solid fill components are secured to the exterior-facing side 316 of the PCBA 314, and the hashed fill components are secured to the interior-facing side 318 of the PCBA 314. Each of the UWB antennas 122 is depicted as a round patch antenna with the diameter equal to one half of the wavelength of the UWB channel of operation (e.g., measured based on the center frequency of the channel). However, it should be appreciated that one or more of the UWB antennas 122 may be otherwise shaped and/or sized in other embodiments (e.g., rectangular, irregularly shaped, etc.). For example, depending on the particular embodiment, any given pair of UWB antennas 122 may be spaced part from one another a distance equal to one half of the wavelength of the UWB channel of operation, less than one half of the wavelength of the UWB channel of operation, or greater than one half of the wavelength of the UWB channel of operation. It should be appreciated, however, that the shape, size, and positioning of the UWB antennas 122 can affect the performance of the antenna system.

Figure 4:
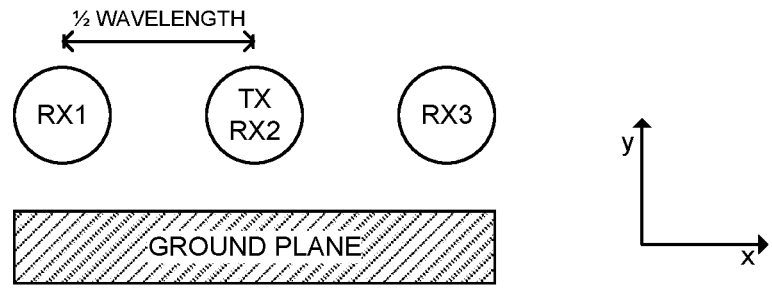
FIGS. 4-10 illustrate various embodiments of UWB antenna arrangements.
Figure 5:
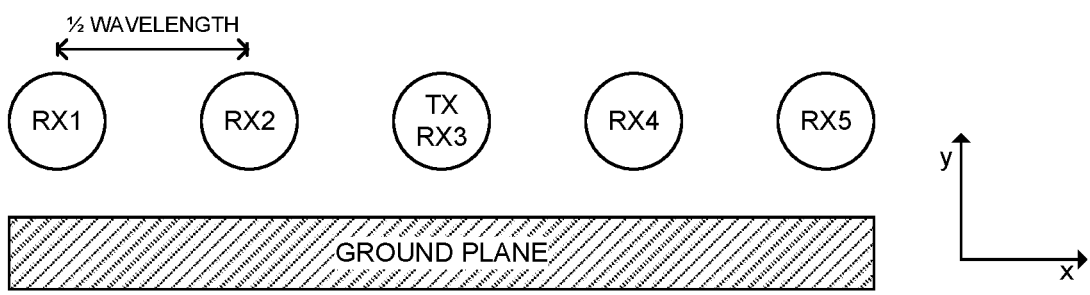

In the embodiment of FIG. 4, the access control device 102 includes three UWB antennas 122 spaced apart from one another along an axis (e.g., a horizontal axis or x-axis), and a ground plane on the opposite side of the PCBA. In the embodiment of FIG. 5, the access control device 102 includes five UWB antennas 122 spaced apart from one another along the axis, likewise with a ground plane on the opposite side of the PCBA. Additionally, in the embodiments of FIGS. 4-5, the UWB antennas 122 are illustratively spaced one half of a wavelength of the UWB channel of operation apart from one another. In other embodiments, the UWB antennas 122 may be positioned less than one half of a wavelength from one another. It should be appreciated that the access control device 102 measures the PDoA between pairs of UWB antennas 122 (e.g., RX1 and RX2), the rapid comparison of which increasing the accuracy of UWB-based tracking/ranging. Further, as the number of UWB antennas 122 that are linearly spaced as depicted in FIGS. 4-5 increases, the antenna array naturally narrows the "viewing" angle.

Figure 6:
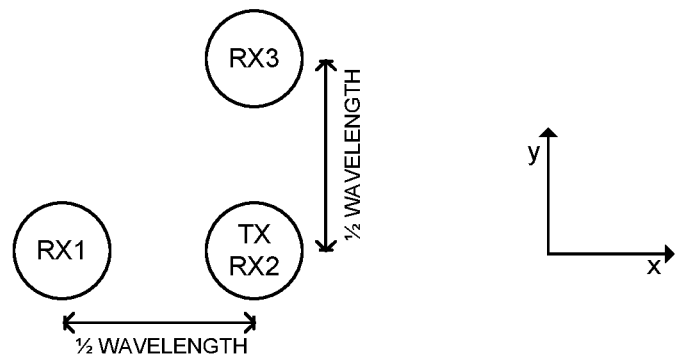
Figure 7:
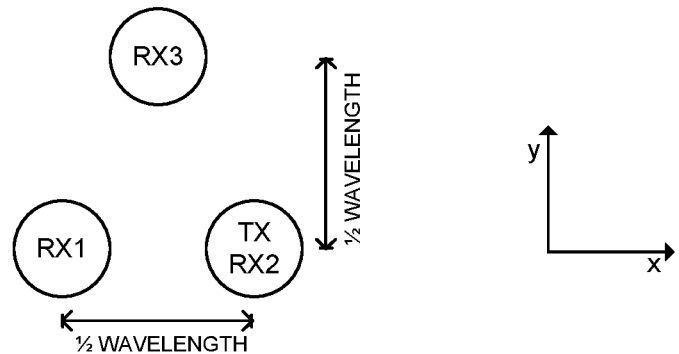

In the embodiments of FIGS. 6-7, the access control device 102 includes three UWB antennas 122 in which two of the UWB antennas 122 are spaced apart from one another along an axis (e.g., a horizontal axis or x-axis), and a third UWB antenna 122 is spaced apart from the other two UWB antennas 122 along a perpendicular axis (e.g., a vertical axis or y-axis). Additionally, the UWB antennas 122 are illustratively space one half of a wavelength of the UWB channel of operation apart from one another along the corresponding axes. In other embodiments, the UWB antennas 122 may be positioned less than one half of a wavelength from one another. It should be appreciated that the access control device 102 may scan the UWB antenna 126 pair positioned along the first/horizontal axis (e.g., RX1 and RX2) for distance and location of the UWB device 106, whereas the access control device 102 may scan the UWB antenna 126 pair positioned along the second/horizontal axis (e.g., RX2 and RX3) for changes in elevation of the UWB device 106. It should be further appreciated that changes in elevation may initiate a different calibration curve in the horizontal axis (e.g., x-axis), and knowing the elevation information may allow for increased accuracy in the horizontal axis (e.g., x-axis) PDoA result.

Figure 8:
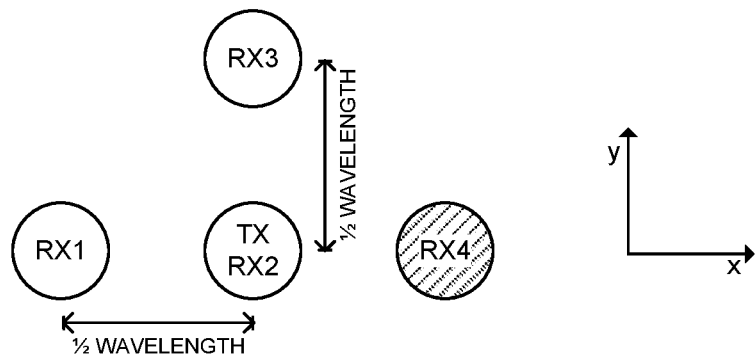
Figure 9:
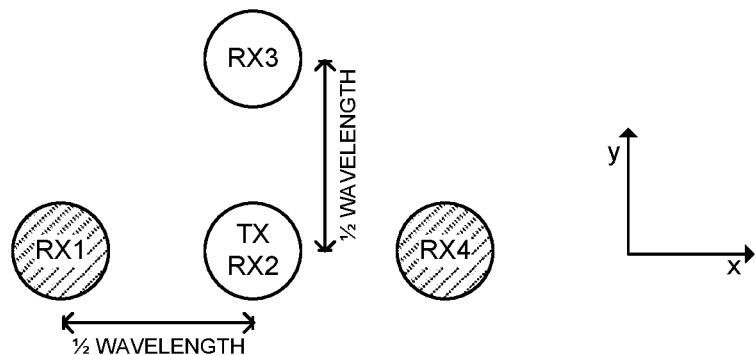

In the embodiments of FIGS. 8-9, the access control device 102 includes four UWB antennas 122 in which three of the UWB antennas 122 are spaced apart from one another along an axis (e.g., a horizontal axis or x-axis), and a fourth UWB antenna 122 is spaced apart from the other three UWB antennas 122 along a perpendicular axis (e.g., a vertical axis or y-axis). Additionally, the UWB antennas 122 are illustratively spaced one half of a wavelength of the UWB channel of operation apart from one another along the corresponding axes. In other embodiments, the UWB antennas 122 may be positioned less than one half of a wavelength from one another. It should be further appreciated that the UWB antennas 122 of the embodiments of FIGS. 8-9 are not all mounted at the same depth (e.g., in the z-axis direction). Instead, in the illustrative embodiment of FIG. 8, three of the UWB antennas 122 (RX1, RX2, and RX3) are secured to the top layer (e.g., exterior-facing side 316) of the PCBA (e.g., the PCBA 314), whereas the fourth UWB antenna 122 (RX4) is secured to the bottom layer (e.g., interior-facing side 318) of the PCBA (e.g., the PCBA 314). Similarly, in the illustrative embodiment of FIG. 9, two of the UWB antennas 122 (RX2 and RX3) are secured to the top layer (e.g., exterior-facing side 316) of the PCBA (e.g., the PCBA 314), and two of the UWB antennas 122 (RX1 and RX4) are secured to the bottom layer (e.g., inter-facing side 318) of the PCBA (e.g., the PCBA 314). As described above, the linear placement of multiple antennas allows for extended performance in the x-axis direction. Additionally, by mounting one or more of the UWB antennas 122 at different depths relative to the top layer (e.g., with small depth differences), performance at extreme angles may be improved. It should be further appreciated that, in some embodiments, the UWB antenna(s) 122 secured to the inter-facing side 318 of the PCBA 314 may benefit from the waveguide 326 providing for unobstructed RF transmission to/from the UWB antenna(s) 122.

Figure 10:
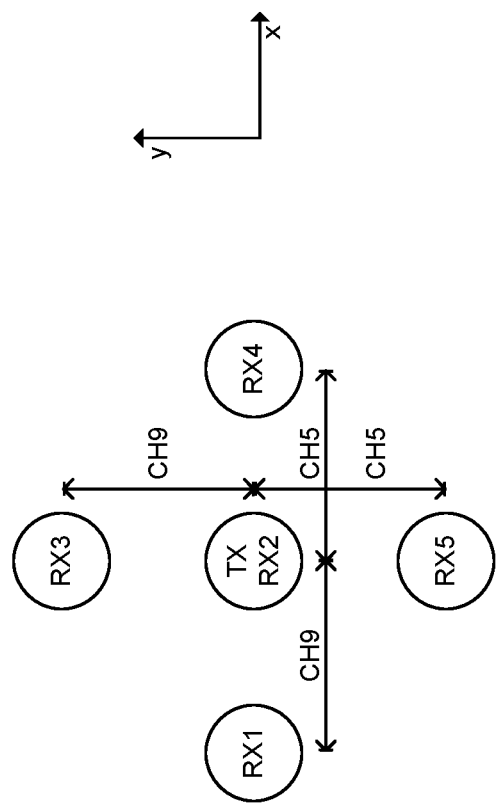

In the embodiment of FIG. 10, the access control device 102 includes five UWB antennas 122 that are sized and spaced for compact dual channel optimization and vertical and horizontal polarization. In particular, the illustrative embodiment is optimized for operation on the universal channel for UWB communication—channels 5 and 9. Accordingly, the illustrative embodiment reflects optimized antenna sizing and spacing for operation on channel 5 while also reflecting optimized sizing and spacing for operation on channel 9. As shown, three of the UWB antennas 122 (RX1, RX2, and RX4) are spaced apart from one another along an axis (e.g., a horizontal axis or x-axis), and three of the UWB antennas 122 (RX3, RX2, and RX5) are spaced apart from one another along a perpendicular axis (e.g., a vertical axis or y-axis). Additionally, the UWB antennas 122 optimized for channel 9 (RX1, RX2, and RX3) are spaced one half of a wavelength of UWB channel 9 (e.g., the center frequency of that channel) apart from one another along the respective axes, and the UWB antennas 122 optimized for channel 5 (RX2, RX4, and RX5) are spaced one half of a wavelength of UWB channel 5 (e.g., the center frequency of that channel) apart from one another along the respective axes. By way of example, the center frequency of UWB channel 9 is 7.9872 GHz (with a half wavelength of 18.8 mm). Accordingly, in various embodiments, UWB antennas 122 optimized for operation on UWB channel 9 may be spaced 18.0 mm apart, or 16.0 mm apart (e.g., which yields improved results relative to 18.0 mm spacing based on simulated data). Further, in some embodiments, a ground shield may be added and optimized for the respective channels of operation. Although the embodiment of FIG. 10 is described in reference to UWB channels 5 and 9, it should be appreciated that the access control device 102 may be optimized to operate on additional or alternative UWB channels in other embodiments using technologies similar to those described herein.

It should be further appreciated that the UWB antenna solutions described herein may be used in conjunction with other communication circuitry and/or other access control technologies depending on the particular embodiment of the access control device 102. For example, in some embodiments, the access control device 102 may combine UWB, Bluetooth (e.g., BLE), Wi-Fi, Ethernet, NFC, proximity card, RS-485, and/or other technologies into a single compact form factor (e.g., with minimal interference or cross talk between antennas structures and/or electrical filtering per antenna to improve in-band and reject out-of-band performance optimal for each wireless technology). Further, in some embodiments, capacitive touch and/or proximity detection may be integrated into a PCBA design that includes the UWB antennas 122. Additionally, in some embodiments, the access control device 102 may include a side-facing UWB antenna (e.g., on a different PCBA) or otherwise angled antenna for improved resolution.

Figure 11:
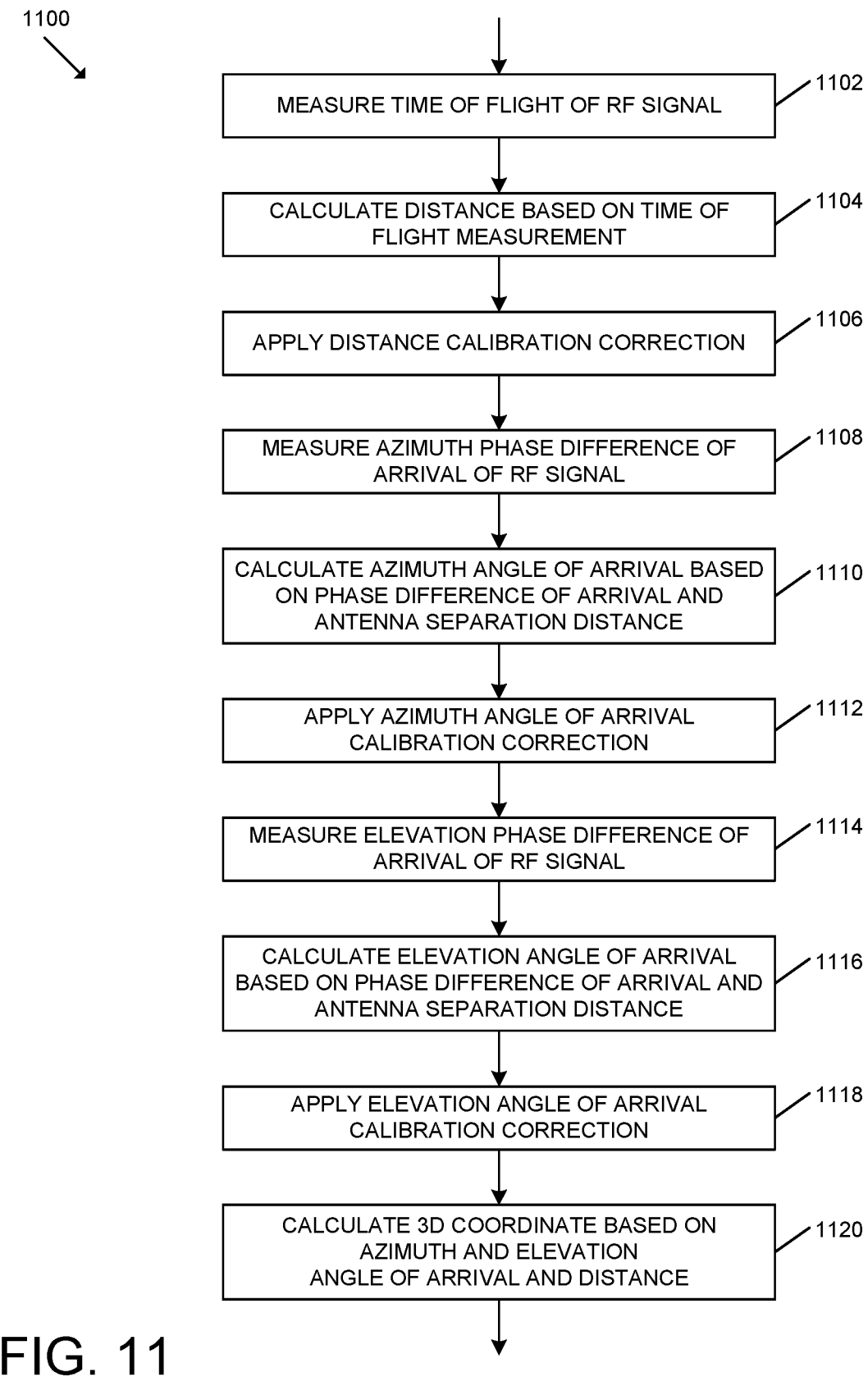
FIG. 11 is a simplified flow diagram of at least one embodiment of a method for performing a UWB ranging session.

Referring now to FIG. 11, in use, the access control device 102 may execute a method 1100 for performing a UWB ranging session. It should be appreciated that the particular blocks of the method 1100 are illustrated by way of example, and such blocks may be combined or divided, added or removed, and/or reordered in whole or in part depending on the particular embodiment, unless stated to the contrary. Although the description of FIG. 11 applies equally to the electronic lock 302 in various embodiments, it should be appreciated that FIG. 11 is described in reference to the access control device 102 for brevity of the description.

The illustrative method 1100 begins with block 1102 in which the access control device 102 measures a time of flight of an RF signal received by the UWB antennas 122 from the UWB device 106. In block 1104, the access control device 102 calculates a distance of the UWB device 106 relative to the access control device 102 based on the time of flight measurement. In block 1106, the access control device 102 may apply a distance calibration correction to the calculated distance to improve the accuracy of the distance calculation.

In block 1108, the access control device 102 measures the azimuth phase difference of arrival of the RF signal received by the UWB antennas 122 from the UWB device 106. In block 1110, the access control device 102 calculates an azimuth angle of arrival of the RF signal based on the phase difference of arrival and the antenna separation distance of the respect UWB antennas 122. It should be appreciated that the antenna separation distance may be stored in the firmware/software of the access control device 102 for retrieval during such calculations. Further, in some embodiments, the access control device 102 may calculate an azimuth angle of arrival of the RF signal based on a look-up table (e.g., with PDoA as the input) and/or using other techniques. In block 1112, the access control device 102 may apply an azimuth angle of arrival calibration correction to the calculated angle to improve the accuracy of the azimuth angle of arrival calculation.

In block 1114, the access control device 102 measures the elevation phase difference of arrival of the RF signal received by the UWB antennas 122 from the UWB device 106. In block 1116, the access control device 102 calculates an elevation angle of arrival of the RF signal based on the phase difference of arrival and the antenna separation distance of the respect UWB antennas 122. Further, in some embodiments, the access control device 102 may calculate an elevation angle of arrival of the RF signal based on a look-up table (e.g., with PDoA as the input) and/or using other techniques. In block 1118, the access control device 102 may apply an elevation angle of arrival calibration correction to the calculated angle to improve the accuracy of the elevation angle of arrival calculation.

In block 1120, the access control device 102 calculates a three-dimensional coordinate of the UWB device 106 based on the calculated azimuth angle of arrival of the RF signal, elevation angle of arrival of the RF signal, and distance of the UWB device 106 relative to the access control device 102.

Although the blocks 1102-1120 are described in a relatively serial manner, it should be appreciated that various blocks of the method 1100 may be performed in parallel in some embodiments. It should be further appreciated that the method 1100 of FIG. 11 is described by way of example, and the access control device 102 may employ other methods and techniques for determining the relative location of the UWB device 106 based on the received UWB signals in other embodiments.

What is claimed is:

1. An electronic lock configured to be secured to a door having a secure side and an unsecure side, the electronic lock comprising:
   an exterior escutcheon on the unsecure side of the door;
   an interior escutcheon on the secure side of the door;
   a printed circuit board assembly (PCBA) positioned within the exterior escutcheon; and
   a plurality of ultra wideband (UWB) antennas secured to an exterior-facing side of the PCBA, wherein the plurality of UWB antennas comprises a first UWB antenna and a second UWB antenna configured to operate on a first UWB channel, and wherein the second UWB antenna is positioned no greater than one half of a wavelength of the first UWB channel from the first UWB antenna along a first axis.

2. The electronic lock of claim 1, wherein the first axis is a horizontal axis.

3. The electronic lock of claim 1, wherein the plurality of UWB antennas comprises a third UWB antenna configured to operate on the first UWB channel and positioned no greater than one half of the wavelength of the first UWB channel from the second UWB antenna along the first axis.

4. The electronic lock of claim 1, wherein the plurality of UWB antennas comprises a third UWB antenna configured to operate on the first UWB channel and positioned no greater than one half of the wavelength of the first UWB channel from the second UWB antenna along a second axis perpendicular to the first axis.

5. The electronic lock of claim 1, further comprising a third UWB antenna secured to an interior side of the PCBA.

6. The electronic lock of claim 5, further comprising a waveguide positioned between the third UWB antenna and a surface of the interior escutcheon; and
   wherein the waveguide is structured to allow for unobstructed radio frequency transmission.

7. The electronic lock of claim 6, further comprising a housing defined at least in part by the interior escutcheon and the exterior escutcheon; and
   wherein a cavity within the housing defines the waveguide.

8. The electronic lock of claim 1, wherein the plurality of UWB antennas comprises a third UWB antenna configured to operate on a second UWB channel and positioned no greater than one half of a wavelength of the second UWB channel from the second UWB antenna.

9. The electronic lock of claim 8, wherein the second UWB antenna is positioned one half of the wavelength of the first UWB channel from the first UWB antenna and the third UWB antenna is positioned one half of the wavelength of the second UWB channel from the second UWB antenna.

10. The electronic lock of claim 1, wherein the one half of the wavelength of the first UWB channel is determined based on a center frequency of the first UWB channel.

11. The electronic lock of claim 1, further comprising:
    a processor; and
    a memory comprising a plurality of instructions stored thereon that, in response to execution by the processor, causes the electronic lock to determine whether a user intends to access a passageway secured by the door based on signals received by the plurality of UWB antennas.

12. An access control device, comprising:
    a lock mechanism adapted to control access to a passageway;
    a printed circuit board assembly having a first side and a second side;
    a first ultra wideband antenna secured to the first side of the printed circuit board assembly and configured to operate on a first ultra wideband channel;
    a second ultra wideband antenna secured to the first side of the printed circuit board assembly no greater than one half of a wavelength of the first ultra wideband channel from the first ultra wideband antenna along a first axis and configured to operate on a first ultra wideband channel;
    an exterior escutcheon adapted to be secured to an unsecure side of a door and to house the printed circuit board assembly;
    a processor; and
    a memory comprising a plurality of instructions stored thereon that, in response to execution by the processor, causes the access control device to determine whether a user intends to access the passageway based on signals received by the first ultra wideband antenna and the second ultra wideband antenna from a mobile device of the user.

13. The access control device of claim 12, further comprising a third ultra wideband antenna secured to the first side of the printed circuit board assembly no greater than one half of the wavelength of the first ultra wideband channel from the second ultra wideband antenna along the first axis and configured to operate on the first ultra wideband channel.

14. The access control device of claim 12, further comprising a third ultra wideband antenna secured to the first side of the printed circuit board assembly no greater than one half of the wavelength of the first ultra wideband channel from the second ultra wideband antenna along a second axis perpendicular to the first axis and configured to operate on the first ultra wideband channel.

15. The access control device of claim 12, further comprising a third ultra wideband antenna secured to the second side of the printed circuit board assembly.

16. The access control device of claim 15, further comprising:
   an interior escutcheon adapted to be secured to a secure side of the door; and
   a waveguide structured to allow for unobstructed radio frequency transmission that is positioned between the third ultra wideband antenna and a surface of the interior escutcheon.

17. The access control device of claim 16, further comprising a housing defined at least in part by the interior escutcheon and the exterior escutcheon; and
   wherein a cavity within the housing defines the waveguide.

18. The access control device of claim 12, further comprising a third ultra wideband antenna configured to operate on a second ultra wideband channel and secured to the first side of the printed circuit board assembly no greater than one half of a wavelength of the second ultra wideband channel from the second ultra wideband antenna.

19. The access control device of claim 12, wherein the one half of the wavelength of the first ultra wideband channel is determined based on a center frequency of the first ultra wideband channel.

20. An access control system, comprising:
   a mobile device; and
   an access control device including (i) a printed circuit board assembly having a first side and a second side, (ii) a first ultra wideband antenna secured to the first side of the printed circuit board assembly and configured to operate on a first ultra wideband channel, (iii) a second ultra wideband antenna secured to the first side of the printed circuit board and configured to operate on the first ultra wideband channel, (iv) an exterior escutcheon adapted to be secured to a structure at an unsecure side of a passageway and to house the printed circuit board assembly, (v) a processor, and (vi) a memory comprising a plurality of instructions stored thereon that, in response to execution by the processor, causes the access control device to determine whether a user intends to access the passageway based on signals received by the first ultra wideband antenna and the second ultra wideband antenna from the mobile device.

* * * * *